Sept. 12, 1961  J. HALLER ET AL  2,999,704
TOLERANCE RING
Filed Sept. 13, 1955
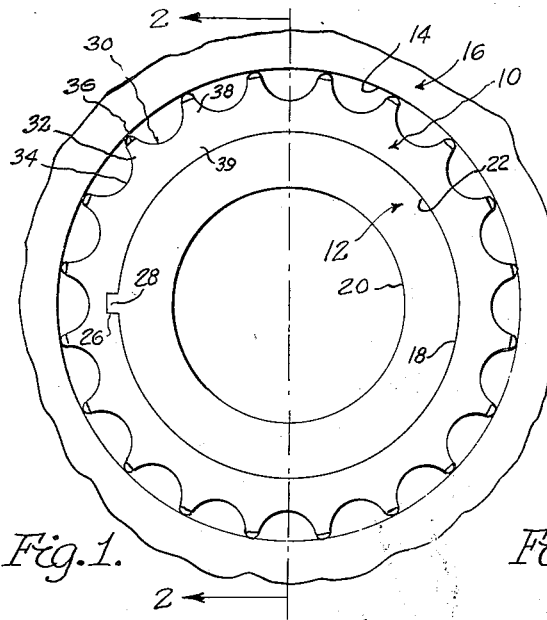
Fig. 1.
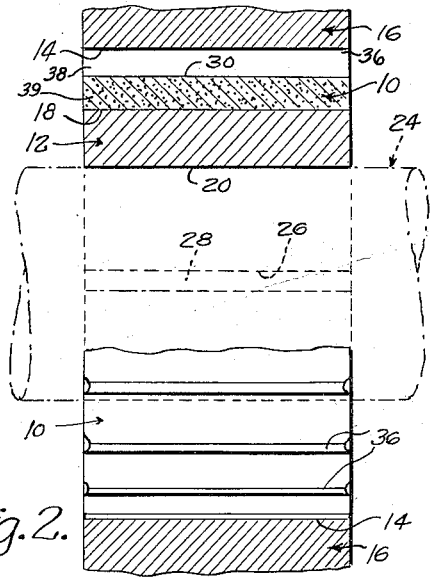
Fig. 2.
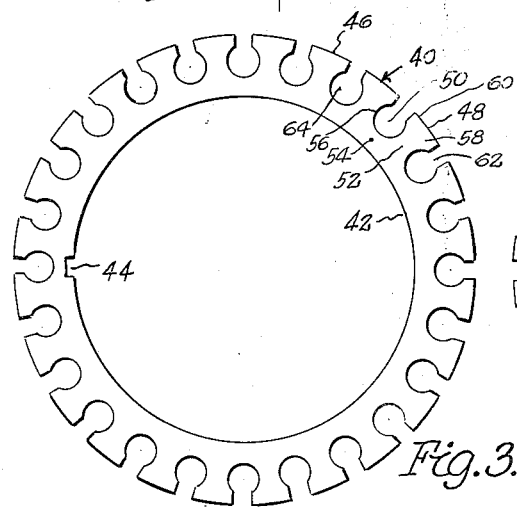
Fig. 3.
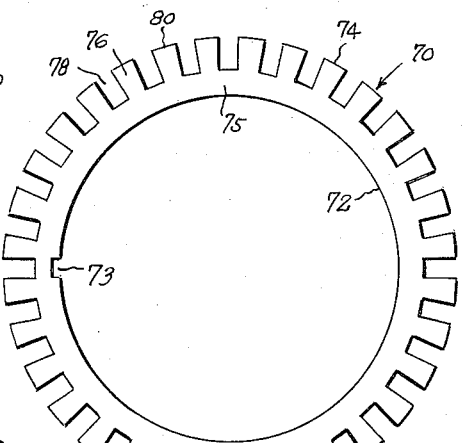
Fig. 4.
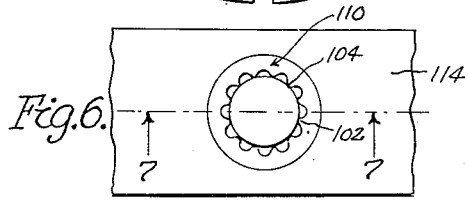
Fig. 6.
Fig. 5.
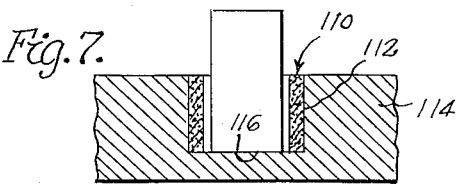
Fig. 7.
INVENTORS
John Haller
Lewis W. Alexander
BY Barthel + Bugbee.
Attys

United States Patent Office 2,999,704
Patented Sept. 12, 1961

2,999,704
TOLERANCE RING
John Haller, 18500 Sheldon Road, and Lewis W. Alexander, 41131 E. 8 Mile Road, both of Northville, Mich.
Filed Sept. 13, 1955, Ser. No. 534,120
6 Claims. (Cl. 287—52)

This invention relates to spacing devices and, in particular, to so-called tolerance rings for mounting machine elements of circular cross-section, such as bearings, studs, wheels, pulleys, screws and the like with a fit which is sufficiently snug to hold the element firmly yet sufficiently yieldable to prevent the setting up of serious strains which might cause deformation or actual breakage.

One object of this invention is to provide a tolerance ring which may be made of sintered powdered metal in an inexpensive by exceptionally efficient form wherein the tolerance ring serves as an intermediary between the machine element and its mount in such a manner as to take up variations in manufacturing dimensions while holding the machine element snugly and firmly.

Another object is to provide a sintered powdered metal tolerance ring of the foregoing character having multiple circumferentially-spaced teeth on the periphery thereof separated by multiple recesses, the configuration of the teeth and recesses being such as to permit sufficient radial yielding to absorb departures from desired dimensions while holding the machine element immovable and without deformation or excessive strain.

Another object is to provide a tolerance ring of the foregoing character, the teeth of which are configured to absorb differential expansion arising in a bearing of excessively expansible material, such as nylon, which expansion might otherwise unduly load the bearing by expansion resulting in an excessive change in the running clearance of the bearing, thereby also eliminating an undesired change in bearing clearance resulting from press fitting the bearing into the bore of a rigid housing during assembly of the machine.

Another object is to provide a tolerance ring of the foregoing character wherein the teeth are separated from one another by wide recesses of considerably greater width than the tips of the teeth themselves so that a maximum variation in assembly dimensions is provided and wherein the major part of the movement in accommodating the machine element to the bore in which it is mounted is absorbed by the tips of the teeth and not transmitted to the periphery of the machine element mounted in the tolerance ring, for example, a bearing sleeve.

Another object is to provide a sintered powdered metal tolerance ring of the foregoing character wherein the teeth have broad tips of considerable arcuate extent separated from one another by undercut recesses, with the result that the tips of the teeth collectively constitute a large proportion of the circumference of the tolerance ring, thereby providing a large surface area at the tips of the teeth to prevent turning of the tolerance ring, yet also providing a reduced-width neck portion on each tooth which absorbs strains at minimum stresses.

Another object is to provide a sintered powdered metal tolerance ring of the foregoing character wherein the teeth are of approximately rectangular shape separated from one another by approximately rectangular notches, thereby providing a simple shape of tooth and recess while affording adequate movement and resilience.

Another object is to provide a sintered powdered metal tolerance ring of the foregoing character for use as an insert in a cast part, so that studs, screws, bearings and other machine elements may be press-fitted into position without setting up stresses and strains in the cast part which might result in breakage, the teeth in such inserts being on the internal surface of the tolerance ring and the cylindrical surface on the outside where it engages the casting.

Other objects and advantages of the invention will become apparent during the course of the following description of the accompanying drawing, wherein:

FIGURE 1 is a side elevation of an approximately cylindrical machine element mounted in a cylindrical bore of a machine housing by means of a sintered powdered metal tolerance ring having narrow-tipped multiple teeth separated from one another by wide recesses affording a maximum possible variation in assembly dimensions with the necessary yielding taking place mainly in and near the tips of the teeth, without excessive stress reaching the periphery of the machine element mounted therein;

FIGURE 2 is a longitudinal section taken along the line 2—2 in FIGURE 1, showing a shaft rotatably mounted in the machine element supported by the sintered powdered metal tolerance ring, with the tolerance ring shown in elevation in the lower half of FIGURE 2;

FIGURE 3 is a side elevation of a modified sintered powdered metal tolerance ring according to the invention wherein the teeth have broad tips separated from one another by undercut recesses so that the large surface area at the tips of the teeth prevents turning of the tolerance ring;

FIGURE 4 is a side elevation of a modified sintered powdered metal tolerance ring according to the invention, wherein the multiple teeth and their recesses are of approximately rectangular shape so as to provide simplicity of form and ease of manufacturing with adequate absorption of stress and a sufficiently large resilience for most purposes;

FIGURE 5 is a fragmentary side elevation of a further modified sintered powdered metal tolerance ring according to the invention, having characteristics similar to that of FIGURE 1, but provided with internal teeth, so as to be especially well adapted to the absorption of expansion resulting from the machine element mounted therein, such as, for example, a sleeve bearing of so-called nylon plastic, which is subject to large changes of dimension as the result of frictional heat developed during running, due to its high coefficient of thermal expansion;

FIGURE 6 is a top plan view of a further modified sintered powdered metal tolerance ring which is especially well adapted for use as an insert in a casting, for the reception of press-fitted studs, screws, bearings or other machine elements without the transmission of stress and consequent strain to the casting, thereby preventing breakage which otherwise frequently arises in such assemblies; and FIGURE 7 is a longitudinal section taken along the line 7—7 in FIGURE 6.

Referring to the drawing in detail, FIGURES 1 and 2 show one form of sintered powdered metal tolerance ring, generally designated 10, installed for the purpose of mounting a machine element, such as a sleeve bearing, in the bore 14 of a mounting body 16, such as a machine housing. The machine element 12 is provided with external and internal cylindrical surfaces 18 and 20 respectively, the former for reception within the cylindrical bore 22 of the tolerance ring 10, the latter for rotatably receiving a rotary machine element 24 (FIGURE 2), such as a shaft. Relative rotation between the tolerance ring 10 and the machine element 12 is prevented in any suitable manner such as, for example, by providing the tolerance ring 10 with a groove 26 and the machine element 12 with a spline 28 fitting the groove 26.

The tolerance ring 10 is of annular form, having, as previously stated, a generally cylindrical internal surface or bore 22 and a toothed or undulating external surface or periphery 30. The periphery 30 is made up of alternate teeth 32 and recesses 34. The teeth 32 have relatively narrow tips or points 36 and relatively broad bases 38 joining them to the annular inner portion 39 so that the capacity for yielding is concentrated largely in the vicinity of the tips 36 of the teeth 32. The teeth 32 are separated from one another by pitch or circumferential distances which determine the shape of the recesses 34. For example, with a larger number of teeth than that shown in FIGURE 1, for a given diameter, the tolerance ring 10 will have circumferentially narrower recesses, whereas with a smaller number of teeth, the recesses 34 will become wider. By varying the number of teeth for a given diameter of tolerance ring, the amount of yielding of the ring may be additionally controlled. The shape of the tolerance ring of FIGURES 1 and 2 enables it to accommodate maximum assembly tolerances without transmitting the stresses and strains resulting from excessive tolerances to the machine element 12.

The sintered powdered metal tolerance ring 10 is, as its name suggests, formed from powdered metal which is briquetted in correspondingly-shaped molds by means of a conventional briquetting press using conventional powdered metal molding procedures, after which the annular toothed briquette thus shaped is placed in a conventional sintering oven and subjected to a sintering heat which causes the particles to adhere tenaciously to one another and acquire great structural strength. The powdered metal of which the tolerance ring 10 is constructed may be of any suitable type, such as powdered iron, powdered bronze or other conventional metal or alloys used in powder metallurgy. The porosity of the tolerance ring may also be varied in order to further control the resilience and yieldability of the tolerance ring; a low density tolerance ring with high porosity gives a large amount of yieldability, whereas a high density of the tolerance ring 10 imparts a lower capacity for yielding under the use of maximum tolerances.

The sintered powdered metal tolerance ring, generally designated 40, shown in FIGURE 3 is constructed by a similar process from similar materials and briquetted and sintered in a manner similar to the tolerance ring 10 of FIGURES 1 and 2, but is employed where it is desired that the tolerance ring have a maximum resistance to rotation within the mounting bore 14 in the machine housing or other mounting body 16. For this purpose, the tolerance ring 40 as in the case of the tolerance ring 10 is provided with a generally cylindrical bore 42 for receiving the machine element 12, together with a groove 44 for receiving the spline 28 of the machine element 12 in order to prevent relative rotation therebetween. The periphery 46 is made up of multiple teeth 48 separated from one another by multiple approximately keyhole-shaped recesses 50. Each tooth 48 is composed of a base portion 52 where it joins the annular inner portion 54, a relatively narrow neck portion 56 and a relatively broad tip portion 58 with a tip surface 60 forming a part of a cylinder and having a maximum gripping effect on the machine body bore 14 in which it is mounted. The tip portions 48 are separated from one another by narrow peripheral gaps 62 in the recesses 50, the inner portions 64 of which undercut the tip portions 58 so as to be wider than the gaps 62.

The machine element 12 is mounted in the housing body 16 in a similar manner to that described in connection with FIGURE 1, but the tolerance ring 40 has a greater frictional engagement with the mounting body bore 14 so as to effectively prevent relative rotation therebetween while enabling the teeth 48 to yield or contract radially in response to the application of excessive tolerances without transmitting this stress and consequent strain to the machine element 12 or to the shaft or other part 24 supported therein.

The further modified sintered powdered metal tolerance ring, generally designated 70, shown in FIGURE 4 is also provided with an inner surface or bore 72 and groove 73 in its annular inner portion 75 for receiving the machine element 12 and is constructed of sintered powdered metal in the manner described above in connection with FIGURES 1 and 2. The periphery 74 of the tolerance ring 70 is made up of multiple teeth 76 and recesses 78 of approximately rectangular configuration, so that yieldability is provided, together with simplicity of tooth and recess shape, the tip surfaces 80 being of lesser circumferential extent than the tooth surfaces 60 of the tolerance ring 40 yet of greater extent than the tips 36 of the teeth 32 of the tolerance ring 10.

The further modified internally-toothed tolerance ring 90 of FIGURE 5 has an external annular portion or periphery 92 which is sufficiently unbroken circumferentially and which has a substantially cylindrical circumferential surface 94 fitting into the correspondingly cylindrical bore 14 in the mounting body or machine housing 16. The machine element 96 mounted in the tolerance ring 90, on the other hand, has external and internal substantially cylindrical surfaces 98 and 100 respectively, and is of material of excessively high thermal coefficient of expansion, such as the synthetic plastic known as nylon. The tolerance ring 90 has internal teeth 102 with narrow tips 104 engaging the peripheral surface 98 of the machine element 96, but broad bases 106 connecting the teeth 102 to the annular peripheral portion 92 of the tolerance ring 90. The latter is constructed of sintered powdered metal in the manner similar to that described in connection with the foregoing forms of the invention, and is characterized during operation by absorbing an excessive outward radial expansion of the machine element 96, such as is characteristic of nylon sleeve bearings, thereby preventing the bearing 96 from constricting the shaft or other rotary element mounted therein. The major portion of the yielding is absorbed by the tip portion 104 of the tolerance ring 90, so that only a minor portion of this radial motion reaches the annular peripheral portion 92 thereof.

The modified tolerance ring, generally designated 110, shown in FIGURES 6 and 7, is generally similar in configuration to the internally-toothed tolerance ring 90 shown in FIGURE 5, hence similar parts are designated with similar reference numerals. The tolerance ring 110, however, is for the slightly different purpose of being used as an insert in a cup-shaped depression 112 in a casting 114, or cast as a unit therewith so that the end of the insert 110 engages the bottom surface 116 of the depression 112. The tolerance ring 110 is also made of porous sintered powdered metal, as in the previous forms of the invention, and its form enables it to receive press-fitted studs, screws, bearings or other machine elements without requiring close tolerances, variations in size being automatically absorbed by the expansion or contraction of the tips 104 of the teeth 102 in the manner described above in connection with FIGURE 5. The use of the tolerance rings 110 in such castings 114 also prevents excessive strain and consequent breakage of such castings, especially where the casting is made from a brittle material.

What I claim is:

1. A tolerance ring comprising a generally annular body of porous sintered powdered metal having outer and inner generally concentric peripheries, one of said peripheries having radially-compressible teeth projecting outwardly therefrom in circumferentially-spaced relationship therearound and recesses disposed between said teeth, said teeth having circumferentially broad tips and said tips having widths substantially equal to the maximum widths of said teeth.

2. A tolerance ring comprising a generally annular body of porous sintered powdered metal having outer and inner generally concentric peripheries, one of said peripheries having radially-compressible teeth projecting therefrom in circumferentially-spaced relationship therearound and recesses disposed between said teeth, said teeth having circumferentially broad tips and circumferentially broad bases with narrower necks therebetween.

3. A tolerance ring comprising a generally annular body of porous sintered powdered metal having outer and inner generally concentric peripheries, one of said peripheries having radially-compressible teeth projecting therefrom in circumferentially-spaced relationship therearound and recesses disposed between said teeth, said teeth having circumferentially broad tips and circumferentially broad bases with narrower necks therebetween, the surfaces of said tips being substantially coincident with the surface of a cylinder concentric with one of said peripheries.

4. A tolerance ring comprising a generally annular body of porous sintered powdered metal having outer and inner generally concentric peripheries, one of said peripheries having radially-compressible teeth projecting therefrom in circumferentially-spaced relationship therearound and recesses disposed between said teeth, said teeth having circumferentially broad tips and circumferentially broad bases with narrow necks therebetween, the surfaces of said tips being substantially coincident with the surface of a cylinder concentric with one of said peripheries, and said recesses being approximately keyhole-shaped.

5. A tolerance ring comprising a generally annular body of porous sintered powdered metal having outer and inner generally concentric peripheries, one of said peripheries having radially-compressible teeth projecting therefrom in circumferentially-spaced relationship therearound and recesses disposed between said teeth, said teeth being of approximately rectangular cross-section, said teeth having circumferentially broad tips and said tips having widths substantially equal to the maximum widths of said teeth.

6. A tolerance ring comprising a generally annular body of porous sintered powdered metal having outer and inner generally concentric peripheries, one of said peripheries having radially-compressible teeth projecting therefrom in circumferentially-spaced relationship therearound and recesses disposed between said teeth, said teeth and said recesses being of approximately rectangular cross-section, said teeth having circumferentially broad tips and said tips having widths substantially equal to the maximum widths of said teeth.

References Cited in the file of this patent

UNITED STATES PATENTS

| | | |
|---|---|---|
| 2,571,868 | Haller | Oct. 16, 1951 |
| 2,709,907 | Robertson et al. | June 7, 1955 |
| 2,753,886 | Powers | July 10, 1956 |

OTHER REFERENCES

Product Engineering; August 1954. page 561 including lower right photographic illustration (Photostat in 308–P.M.).